Dec. 14, 1948.  E. O. WIRTH ET AL  2,456,605
FUEL SUPPLY SYSTEM
Filed Aug. 6, 1945  3 Sheets-Sheet 2

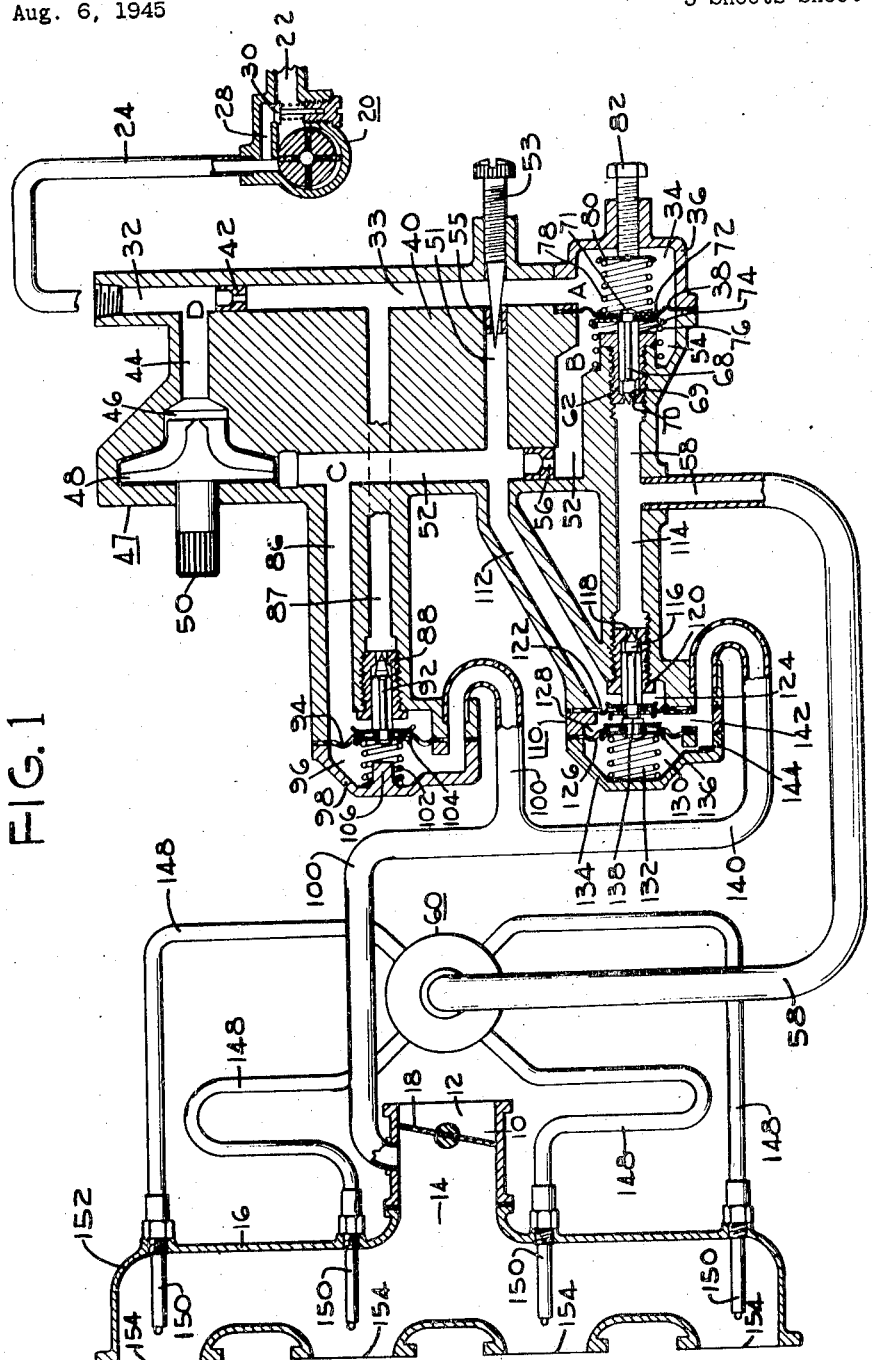

INVENTOR.
FREDERIK BARFOD
BY EMIL O. WIRTH
W. A. Gebhardt
ATTORNEY

Patented Dec. 14, 1948

2,456,605

UNITED STATES PATENT OFFICE 2,456,605

FUEL SUPPLY SYSTEM

Emil O. Wirth and Frederik Barfod, South Bend, Ind., assignors to Bendix Aviation Corporation, South Bend, Ind., a corporation of Delaware Application August 6, 1945, Serial No. 609,230

19 Claims. (Cl. 123—119)

This invention relates to fuel supply systems or devices for internal combustion engines, and more particularly to devices or systems in which liquid fuel is supplied under positive pressure.

An important object of the invention is to provide a fuel feeding system in which the fuel flow is automatically regulated in accordance with certain engine variables such as, for example, engine speed and engine charging pressure.

Another object of the invention is to provide a generally new and improved fuel supply system for automatically controlling the fuel to air ratio under various engine operating conditions and which will provide improved fuel distribution to the engine.

This fuel supply system, while especially applicable to fuel supply systems of the character hereinafter particularly described, is not limited to such uses, but is obviously available, with or without modification, in a great variety of cases where fuel is intended to be supplied under more or less analogous conditions in an internal combustion engine or other fuel consuming device.

Further objects and advantages of the invention will be apparent, to those skilled in the art, from the following detailed description, taken in connection with the accompanying drawing. Although but one embodiment is shown, skilled persons will understand that many variations may be made without departing from the principles disclosed, and I contemplate the employment of any structures, arrangement, or modes of operation that are properly within the scope of the appended claims.

In the drawings:

Figure 1 is a diagrammatic view of an engine fuel system embodying the present invention;

Figure 3:
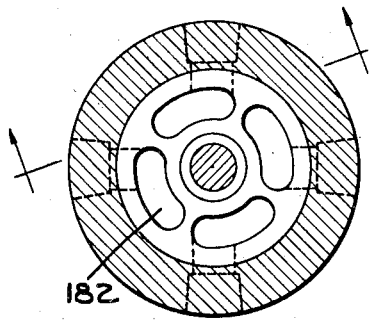
Figure 3 is a section taken on line 3—3 of Figure 2.

In Figure 1 there is shown an induction passage 10 having an air inlet 12, and an outlet 14 connected to the intake manifold 16 of an internal combustion engine, not shown, or to a supercharger inlet, should a supercharger be used, the induction passage 10 being controlled by a throttle valve 18. A supercharger might alternately be connected to the inlet 12 or such a device might be connected to both the inlet 12 and an outlet 14. Liquid fuel is supplied by a pump, indicated generally at 20, which may be operated by the engine, or by any other suitable means, and is capable of supplying fuel under positive, preferably but not necessarily substantially constant, predetermined pressure. This pump may be of any well known type but, as shown, is of the sliding vane type having an inlet 22 receiving fuel from a source, an outlet conduit 24 and a bypass 28 controlled by a pressure responsive valve 30. Fuel from the pump is delivered from the pump outlet conduit 24 to a passage 32 which communicates with a passage 33 connected with a chamber 34 in a casing 36, the fuel pressure in said chamber 34 being at all times substantially the same as that in passage 33, and this pressure in said chamber and passage being hereinafter referred to as pressure A or control pressure. One wall of chamber 34 is closed by a flexible diaphragm 38 which is marginally clamped between the casing 36 and a shoulder of the body 40 of the device. A restriction or jet 42 is provided between the passages 32 and 33 through which fuel is adapted to flow.

Passage 32 is provided with a branch passage 44 which communicates with the impeller chamber 46 of a pump, indicated generally at 47. This pump, as shown, is of the centrifugal type which includes an impeller 48 driven by the engine through a shaft 50 which is suitably connected, by any well known means, with said engine which is not shown herein but which rotates said impeller in direct proportion to the R. P. M. of said engine and is adapted to build up an outlet pressure which provides the metering head for the system.

The outlet of pump 47 is connected to a passage 52 which communicates with a chamber 54 on the side of the diaphragm 38 opposite the chamber 34 by way of a metering restriction or jet 56 therein, the pressure of fuel in said chamber 54 being at all times substantially the same as that in the passage 52 posterior to the jet 56 and this pressure in chamber 54 and passage 52 posterior to jet 57 will be hereinafter referred to as pressure B or metered fuel pressure.

Chamber 54 has an outlet connected by a conduit 58 with a fuel distributor, indicated generally at 60, and which will be more fully described hereinafter. The outlet for the chamber 54 is provided with a fitting 62 having a bore within which a flat sided or fluted valve 68 is slidably guided, said valve having a conical tip 69 cooperating with a valve seat 70 in said fitting for contro'ling the discharge of fuel from chamber 54. The end of the valve 68 opposite the conical tip is attached to the diaphragm 38. As shown, said attached end is riveted over at 71 and washer-like spring retainer cups 72 and 74 are disposed on opposite sides of the diaphragm to reinforce the central portion of same. It is to be noted that said spring retainers have their peripheral edge portions turned outwardly, relative to the diaphragm, thus preventing the diaphragm from being cut or otherwise injured thereby and providing means for retaining the adjacent ends of springs 76 and 78 disposed respectively in chambers 54 and 34. These springs are preferably light and of substantially the same calibration although they may have other characteristics. Spring 76 reacts between the spring retainer 74 and one wall of the chamber 54 for urging the valve 68 in the opening direction, while spring 78 reacts between retainer 72 and a spring retainer 80 disposed in chamber 34, said spring being adapted to urge the valve 68 in the closing direction. The effective force of the springs is adjustable, a screw 82, threadably received in an opening in the casing 36, being provided therefor. It is to be understood that preferably the adjustment is such that the valve 68 is normally slightly open when the engine is inoperative, for a purpose to be described hereinafter.

The passages 52 and 33 are connected together by conduits 86 and 87. One end of conduit 86 communicates with the passage 52 anterior to the restriction 56 and one end of conduit 87 communicates with the passage 33, there being a restriction or orifice 88 provided between said conduits 86 and 87. It is to be noted that the fuel pressure in conduit 86 is at all times substantially the same as the pressure in that portion of the passage 52 anterior to jet 56 and the pressure in said conduit and passage will be hereinafter referred to as pressure C. The pressure in passage 87 will, of course, be the same as that in passage 33 or pressure A.

Means for varying the effective size of orifice 88 comprises a valve 92 connected to a diaphragm 94 by any well known means. One side of the diaphragm is subjected to pressure C. The diaphragm forms one wall of a chamber 96 formed in a housing 98, said chamber being connected by a conduit 100 to a source of engine charging pressure. As shown, said conduit communicates with the induction passage posterior to the throttle valve 18. However, if a supercharger is used, conduit 100 is connected to the engine manifold posterior to the supercharger. A spring 102, in chamber 96, reacts between one wall of said chamber and a spring retainer 104 and is adapted to urge the valve in the closing direction, said spring being so calibrated that the valve 92 will be normally closed. A boss 106 is provided to limit opening movement of valve 92. If desired, means may be provided, similar to the screw 82 arrangement, for adjusting the force of spring 102.

With the foregoing arrangement it will be apparent that the valve 92 is controlled by fuel pressure C and the combined opposing force of spring 102 and the pressure in chamber 96.

It is also to be noted that the pressure in branch passage 44 is at all times substantially the same as that in passage 32 and the pressure in said passages will be hereinafter referred to as pressure D or pump inlet pressure.

Operation

During normal operation fuel is supplied under pressure to the inlet 44 of the centrifugal pump 47 by means such as the fuel pump 20 although other means may also be employed to supply fuel to said inlet 44. Fuel received by pump 47 is discharged under an increased pressure into passage 52 from which it flows through metering orifice 56 to chamber 54, past valve 68 which is opened by the pressure of fuel in chamber 54 acting on diaphragm 38, into conduit 58.

Due to the inherent characteristics of the centrifugal pump 47, the pressure C at the outlet of pump 47 will be greater than the pump inlet pressure D by an amount which is directly proportional to the square of the speed of the pump and consequently directly proportional to the square of the engine speed.

For purposes of illustration, during operation, with the valve 92 in a partially open position, fuel at pressure C will flow through the calibrated restriction 88 into passage 87 and thence into passage 33, then through orifice 42 to the pump inlet 44. As a consequence the pressure in passage 33, herein referred to as control pressure A, will be of a value intermediate the fuel pressure C and pump inlet pressure D, and its value relative to the pressures C and D will depend upon the effective size of orifice 88 relative to the area of orifice 42. For any fixed setting of valve 92, pressure A will remain greater than pressure D and less than pressure C by amounts representing constant percentages of the difference between pressures C and D. Thus, if orifice 88 has an effective area equal to orifice 42, pressure A will remain substantially half way between pressures C and D irrespective of variations in speed of pump 47. It therefore follows that the differential between pressures C and A will likewise vary as the square of engine speed, for a fixed setting of valve 92.

Since the springs 76 and 78 are substantially in balance, except for considerations hereinafter explained, the pressure of the fuel in chamber 54, referred to herein as metered fuel pressure B, will be maintained equal to control pressure A. In the event pressure B should tend to exceed pressure A the valve 68 will tend to open to allow the escape of additional fuel to the nozzle and consequent lowering of pressure B, and the reverse action will occur if B tends to be less than A. It is thus clear that the difference between pressure C and pressure B likewise will vary as the square of the engine speed for a given setting of valve 92.

As is generally known, the quantity of fuel which will flow through a given size metering orifice such as metering jet 56 will vary in proportion to the square root of the differential in pressures C and B on opposite sides of the orifice, and since this differential varies as the square of the engine speed, it will be apparent that the quantity of fuel flowing through orifice 56 for a given setting of valve 92 will vary directly as the engine speed.

In view of the fact that the weight of air flow to an engine at a given manifold pressure varies substantially in direct proportion to the engine speed, except for variations caused by variables such as exhaust back pressure and intake air and exhaust gas temperatures which may be compensated for as described in the copending application of Wirth and Barfod, Serial No. 607,290, filed July 27, 1945, the device here described will supply fuel to the engine in accordance with the air flow thereto.

If at a given engine speed the manifold or engine charging pressure is increased, the weight of air supplied to the engine will likewise increas, and the quantity of fuel supplied to the engine should be correspondingly increased. This increase in fuel flow is accomplished in the present device by the operation of valve 92. Any increase in charging pressure is transmitted through passage 100 to chamber 96 and will cause diaphragm 94 to move to the right, as shown in Figure 1, whereupon the valve 92 will reduce the effective area of the calibrated restriction 88.

Upon decrease in the effective area of orifice 88, pressure A will be reduced so as to more nearly approach pressure D and as a consequence the valve 68 will open to permit discharge of fuel to the engine at a greater rate such that the pressure B will be reduced to equal new pressure A. In other words, reducing pressure A reduces pressure B and thereby increases the differential between fuel pressure C and metered fuel pressure B. Consequently, fuel is delivered through orifice 56 at a greater rate to compensate for the increase in air flow which instigated the change in pressure A.

In the present arrangement the control of valve 92 is such as to provide economizer action, that is to enrich the fuel mixture at high speeds, as required.

Normally when the engine is idling pressure C is relatively low and the manifold suction is very high. Both pressure C and said suction urge the valve 92 in the opening direction against the valve closing force of spring 102 and the forces tending to open the valve are sufficient to overcome the closing force of said spring thereby maintaining the valve in an open position. Under these conditions the engine is supplied with an economical mixture.

When the engine is operating at a relatively high speed, whereat it is desirable to enrich the mixture, the pressure C will be at a relatively high value. However the manifold suction will be substantially lower than at idle so that the combined forces of pressure C and the manifold suction in chamber 96 will be insufficient to maintain the valve 92 open. Upon closing of said valve 92 pressure A will drop and pressure B will rise and effect further opening of the valve 68 to provide the additional fuel required for power enrichment.

If desired, other arrangements may be provided, for obtaining various desired fuel to air relationships in accordance with engine variables.

Provision may be made for enriching the idling fuel mixture as is desired. One means for effecting idle enrichment is to adjust valve 68 so that it is normally slightly open. Thus the fuel metering differential pressure required to balance the diaphragm valve assembly is increased. Then at low differential pressures, corresponding to idle operation, the arrangement is of material effect in producing a relatively large percentage increase in fuel flow, thereby providing the desired rich mixture at idle. However at high differential pressures the arrangement has a negligible effect and has substantially no effect on the richness of the fuel mixture which is maintained at the normal fuel to air ratio.

It is thus apparent that the basic structure will provide a substantially constant mixture richness, but by introducing an extraneous factor to effect variations in the position of valve 68 as by varying the area of the metering orifice 88, any fuel metering characteristic may be obtained. Means other than pump 47 must also be used to create a pressure in passage 52 which varies as the square of engine speed.

ACCELERATION DEVICE

Means for providing a supply of acceleration fuel for enriching the mixture during periods of acceleration comprises a control unit indicated generally at 110. A fuel passage 112 is connected with the passage 52 and a fuel passage 114 is connected with the passage 58. The flow of fuel between passages 112 and 114 is controlled by a valve 116 which controls the effective area of an orifice 118 between said passages 112 and 114. The valve 116 is profiled to permit the passage of fuel thereby and is slidable in a plug 120 in which the orifice 118 is formed. One end of the valve 116 is secured to a diaphragm 122 which forms one wall of a chamber 124 with which the passage 112 communicates, fuel from said chamber 124 being adapted to flow past said valve 116, when open through the orifice 118 and into the passage 114.

The unit 110 is provided with a second diaphragm 126 which is of larger area than diaphragm 122 and which forms one wall of a chamber 128, another wall of which is formed by the diaphragm 122. The diaphragm 126 also forms one wall of a chamber 130 in which a spring 132 is disposed. The spring 132 reacts between a fixed wall 134 of chamber 130 and a spring retainer 136 secured to diaphragm 126. There is a short lug 138 secured to diaphragm 126 on the side thereof opposite the spring retainer 136 and said lug is adapted to abut against the adjacent end of valve 116 for urging the valve in the closing direction, said lug 138 forming a one-way connection between the diaphragm 126 and said valve. A conduit 140 is connected with the conduit 100 for transmitting engine charging pressure to the chambers 128 and 130, the chamber 128 communicating with said conduit 140 by means of a relatively large passage 142 whereas the chamber 130 communicates with said passage 140 by means of a relatively small orifice 144.

Normally the pressures in chambers 128 and 130 are substantially the same and spring 132 is adapted to maintain the valve in the closed position against the pressure of fuel in chamber 124 exerted upon diaphragm 122. Assuming the throttle valve 18 is suddenly opened, as for acceleration purposes, the pressure in chamber 128 will rise faster than that in chamber 130, due to the difference in effective areas of passages 142 and 144 thereby compressing spring 132 and moving the lug 138 away from the adjacent end of valve 116. The pressure of fuel at pressure C on diaphragm 122 then will urge said diaphragm to the left, as shown in the drawing, and effect opening of the valve 116. Upon opening of said valve an additional quantity of fuel will be supplied to the conduit 58 to enrich the mixture for acceleration purposes. Assuming the throttle 18 remains in the position to which it has been moved the pressures in chambers 128 and 130 will shortly equalize and spring 132 will then effect closing of valve 116.

If desired, a fuel connection 51 may be provided between passages 52 and 33, said passage 51 having a manually adjusted needle valve 53 controlling the effective area of a restriction 55 in said passage 51. With this arrangement the fuel system may be adjusted for various installations.

FUEL DISTRIBUTION

Fuel from the conduit 58 is distributed to a plurality of conduits 148 by the distributor 60. The conduits 148 carry the distributed fuel to respective discharge nozzles 150 located in the intake manifold 152 of the engine. For purposes of illustration only the manifold 152 is shown as having four outlets 154 (it may have any other number required by the particular installation) which deliver fuel and air to the various intake ports of the engine which are controlled by inlet valves, not shown. As shown, the nozzles 150 are so arranged that their discharge ends are adjacent the outlets 154 and are axially aligned with said outlets.

Figure 2:
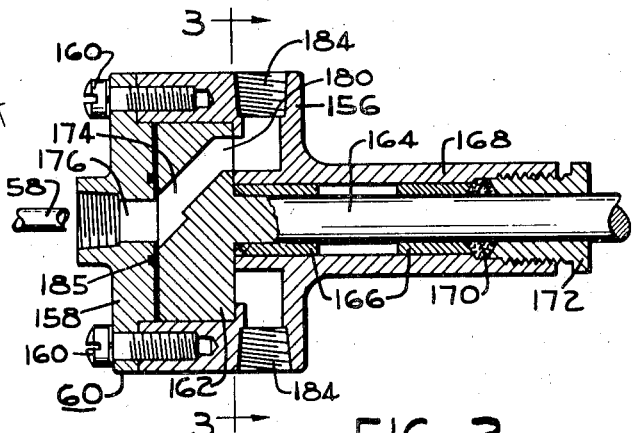
Figure 2 is a diagrammatic sectional view of the fuel distributor shown in Figure 1.
Figure 4:
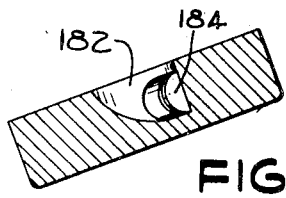
Figure 4 is a section taken on line 4—4 of Figure 3.

Referring now to the enlarged view of the distributor 60, shown in Figures 2, 3 and 4, said distributor comprises a casing 156 having a cover member 158 secured thereto by means of screws 160 or the like. Within the casing is a rotor 162 secured to a shaft 164 which is suitably connected to the engine through some mechanism, not shown, whereby the rotor is rotated in timed relationship with the opening of the intake valves of the engine, not shown. The shaft 164 is shown as being mounted in bearings 166 secured in the tubular extension 168 of the casing 156. Packing 170 is disposed about the shaft 164 and is suitably compressed by a sleeve 172 threaded into the open end of said extension 168. Thus loss of fuel past the shaft 164 is prevented. The rotor 162 has a passage 174 therein, one end of which communicates with one end of the rotor in such a manner as to be in constant communication with an axially arranged inlet port 176 which is connected with the conduit 58. The passage 174 moreover extends through the rotor to a point adjacent the periphery thereof and has an outlet 180, in the face opposite the inlet port 176, which is adapted to register with outlet ports 182, best shown in Figure 3. As said rotor is rotated the ports 182 successively communicate with outlets 184 which are connected with the respective conduits 148 leading to the various fuel nozzles. An annular seal 185 received in a groove in cover member 158 prevents leakage of fuel therepast between said cover 158 and the rotor 162.

In operation as the rotor is rotated the outlet 180 of the rotor passage 174 communicates successively with the respective ports 182 to permit the passage of fuel from conduit 58 to the respective nozzles 150 during the time the respective intake valves are open and said fuel is cut off from said nozzles as the intake valves close. Thus an improved fuel distribution system is provided which supplies fuel to the engine in a uniform manner.

FIGURE 5

Figure 5:
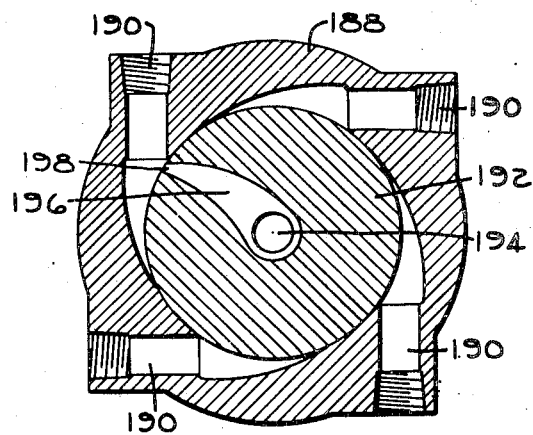
Figure 5 is a diagrammatic sectional view of an alternative fuel distributor arrangement.

Another type of fuel distributor is shown in Figure 5 and comprises a casing 188 having respective outlet passages 190, the inlet ends of said passages communicate with a rotor chamber in which a rotor 192 is disposed and which completely fills said chamber. Fuel from the conduit 58 is supplied to the central portion 194 of the distributing passage 196 in said rotor and said passage extends to the peripheral surface of the rotor. As the rotor is rotated the discharge end 198 of said passage 196 progressively supplies and cuts off fuel to the passages 190 effecting substantially the same cycle of fuel distribution as that of the arrangement shown in Figures 2, 3 and 4.

NOZZLES

Figures 6, 7:
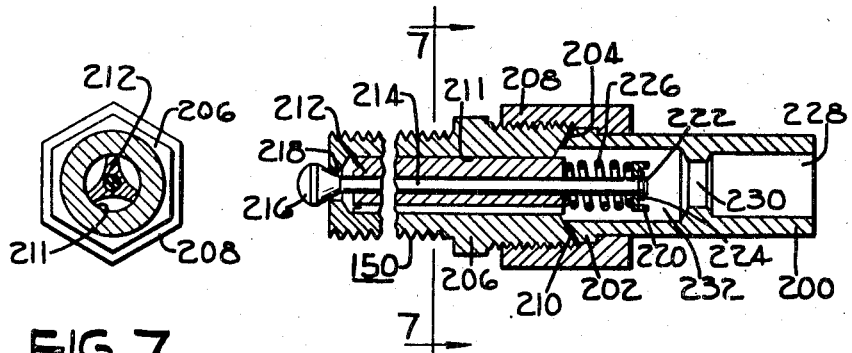
Figure 6 is a diagrammatic sectional view of the fuel nozzle shown in Figure 1.
Figure 7 is a section taken on line 7—7 of Figure 6.

An enlarged view of the nozzle 150 is shown in Figures 6 and 7, said nozzle comprising a fixture 200 having a shoulder portion 202 with an inclined surface 204 disposed adjacent a similarly inclined surface of a body portion 206. The parts 200 and 206 are secured together by a member 208 having an internal shoulder which engages the shoulder portion 202 and a threaded end portion adapted to be threaded onto the adjacent end of the body 206. If desired a gasket 210 may be interposed between the inclined surfaces of the portions 202 and the body member 206. The body 206 is provided with an internal bore 211 in which is press fitted a profiled guide 212. The guide is provided with a central passage in which a movable valve member 214 is slidable, said valve member having an enlarged end 216 adapted to control the outlet port 218 of the nozzle. The inner end of the valve member 214 extends beyond the guide 212 and is provided with a washer 220 secured on the member 214 by the riveted over head 222 of a reduced portion of said member 214, there being a small washer 224 interposed between the riveted over head and the washer 220. A calibrated spring 226 reacts between the adjacent end of the guide 212 and the washer 220 for urging the valve in the closing direction. Fuel enters the passage 228 of the stem 200, flows through a restriction 230 into a passage 232, thence through the bore 210 and out the discharge orifice 218 when the valve 216 is open.

With the foregoing nozzle arrangement fuel may be supplied at a relatively low pressure, for example, about three pounds and said pressure is sufficient to open the valve 216 to permit the discharge of the fuel into the intake manifold. When the fuel is cut off from the nozzle the spring 226 will effect a sharp cut off of the fuel flow.

Figure 8:
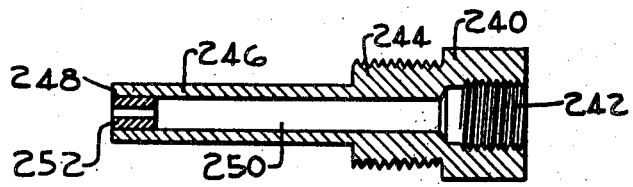
Figures 8 and 9 are sectional views of alternative types of fuel nozzles.

The nozzle shown in Figure 8 comprises a body portion 240 having a threaded inlet 242. A reduced portion 244 is threaded to provide means for securing the nozzle in the intake manifold and a further reduced portion 246 is adapted to extend inwardly of the manifold whereby the discharge end 248 will be located adjacent the respective outlet of said manifold. The inlet 242 communicates with a bore or fuel passage 250 which extends through the parts 244 and 246 of the nozzle and terminates at the discharge end 248. A restriction 252 is provided in the bore 250.

Figure 9:
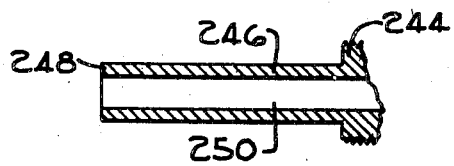

The nozzle shown in Figure 9 is similar in construction to that shown in Figure 8 except for the omission of the restriction 252.

It is preferable to use a nozzle having an opening or fuel discharge passage which is correlated with the pressure of fuel prevailing in the fuel system. For example, a restricted passage such as shown in Figure 8 may be used to advantage in a fuel system wherein the fuel pressures are relatively high, while an arrangement such as shown in Figure 9 may be used in a system wherein the fuel pressures are lower.

From the foregoing it will be apparent that various changes may be made in the various parts of the invention without departing from the principles thereof and it is contemplated that

We claim:

1. A fuel supply system for an internal combustion engine comprising a conduit adapted to connect a source of fuel with the engine; means for creating a fuel pressure in and effecting a flow of fuel through said conduit, the quantity of which will vary directly as the engine speed; means for controlling said flow; means adapted to contain a control pressure developed by the first mentioned means and acting on the second mentioned means for influencing the functioning thereof; and means, including a valve, for varying the control pressure, said means being so constructed and arranged that at engine speeds below a predetermined value the valve is open to provide an economical mixture to the engine, and at speeds above said value said valve is closed to provide for power enrichment.

2. The invention defined by claim 1 wherein said valve is controlled by engine charging pressure and by fuel pressure.

3. The invention defined by claim 1 wherein the last mentioned means is controlled by manifold vacuum and by fuel under substantially the full first mentioned pressure.

4. The invention defined by claim 1 wherein there is also a manually adjusted screw valve for regulating the control pressure.

5. In a fuel system for an internal combustion engine: a source of fuel; a conduit connecting said source of fuel with the engine; a metering orifice in said conduit; means, having an inlet and an outlet, for supplying fuel to said metering orifice at a pressure varying in response to variations in engine speed; means for controlling the fuel flow posterior to the metering means; means adapted to contain a control pressure developed by the first mentioned means and acting on the second mentioned means for influencing the functioning thereof; and means, including a valve, for varying the control pressure, said means being controlled by engine charging pressure and by fuel pressure.

6. The invention defined by claim 5 wherein the last mentioned fuel pressure is substantially equal to the first mentioned pressure.

7. In a fuel system for an internal combustion engine having inlet valves and an intake manifold with a plurality of outlets: a source of fuel; a conduit connecting said source of fuel with the engine; fuel metering means in said conduit; fuel flow control means posterior to the metering means; means, having an inlet and an outlet, for supplying fuel to the metering means at a pressure varying in accordance with engine speed; means for creating a pressure intermediate the first mentioned pressure and the inlet pressure; means for subjecting the fuel flow control means to fluid pressure posterior to the metering means and to the intermediate pressure acting in opposition to said fluid pressure; a fuel distributing device having an inlet and a plurality of outlets; a conduit connecting said inlet with the fuel flow control means posterior thereof, said distributor having a rotor operated in timed relationship with said engine valves; discharge nozzles discharging adjacent the outlets of the manifold; and conduits connecting said nozzles with the respective distributor outlets.

8. The invention defined by claim 7 wherein the distributor comprises a casing enclosing a chamber; a rotor in said chamber; a fuel inlet passage in one wall of the casing and aligned with the axis of the rotor adjacent one end of said rotor; circumferentially arranged outlet passages; and a passage in the rotor adapted to be connected with the fuel inlet passage at all times and to intermittently supply fuel to the outlet passages as said rotor is actuated.

9. The invention defined by claim 7 wherein the distributor includes a chamber; a rotor in said chamber; a closure for said chamber having a fuel inlet passage substantially centrally disposed therein; circumferentially arranged outlets; a passage in the rotor adapted to be connected with the fuel inlet passage at all times and to intermittently supply fuel to the outlets as said rotor is actuated; and a seal between the closure and the rotor to prevent leakage of fuel between said closure and rotor from the adjacent ends of the passage in the closure and the passage in the rotor.

10. In a fuel system for an internal combustion engine having an intake manifold with an outlet; a source of fuel; a fuel conduit having a metering restriction therein connected with said source of fuel; means in said conduit for creating across said restriction a fuel head adapted to vary in accordance with the square of engine speed; means for controlling the fuel flow through said conduit; means adapted to contain a control pressure developed by the first mentioned means and acting on the second mentioned means for influencing the functioning thereof; a fuel discharge passage; and a fuel nozzle connected with said discharge passage and adapted to discharge fuel adjacent the manifold outlet.

11. The invention defined by claim 10 wherein said nozzle includes a valve which is spring loaded in the closing direction.

12. The invention defined by claim 10 wherein there is a restriction in the fuel passage of the fuel nozzle.

13. In a fuel system for an internal combustion engine having inlet valves: a source of fuel; a conduit connecting said source of fuel with the engine; means for creating a fuel pressure in and effecting a flow of fuel through said conduit, the quantity of which will vary directly in accordance with engine speed; means for controlling said flow; means adapted to contain a control pressure developed by the first mentioned means and acting on the second mentioned means for influencing the functioning thereof; means, including a valve, for varying the control pressure, said means being so constructed and arranged that at engine speeds below a predetermined value the valve is maintained open to provide an economical mixture, and at speeds above said value said valve is closed to provide for power enrichment; and fuel distributing means having an inlet; a conduit connecting said inlet with the fuel flow control means posterior thereof, said distributing means having a rotor operated in timed relationship with the engine inlet valves; and means connecting the distributor outlets with the intake manifold.

14. The invention defined by claim 13 and including an acceleration device having a normally closed valve; means, connected with the valve and subjected to fuel pressure for urging the valve in the opening direction; yielding means urging the valve in the closing direction; and means, operably connected with the yielding means and tending to reduce the valve closing effect of said yielding means upon a sudden rise in manifold pressure.

15. A fuel metering device for an engine comprising a fuel conduit for delivering fuel to said engine; an impeller, a metering orifice, a discharge valve, and fuel distributor, in series in said conduit, said impeller and distributor being adapted to be driven by the engine; and a plurality of fuel discharge nozzles adapted to receive fuel intermittently from said distributor and to discharge said fuel into said engine.

16. A fuel metering device for an engine comprising a fuel conduit for delivering fuel to said engine; an impeller, a metering orifice, a discharge valve, and a fuel distributor, in series in said conduit in that order, said impeller and distributor being adapted to be driven by the engine; and a plurality of fuel discharge nozzles adapted to receive fuel from said distributor at a pressure varying in accordance with engine speed and to discharge said fuel into the induction system of said engine.

17. A fuel metering device for an engine comprising a source of fuel at a substantially constant pressure; a conduit for connecting said source with said engine; an engine driven impeller, a metering orifice, a discharge valve, and a fuel distributor, in series in said conduit, said impeller and distributor being adapted to be driven by the engine; and a plurality of fuel discharge nozzles adapted to receive fuel intermittently from said distributor and to discharge it in the intake manifold of said engine.

18. A fuel metering device for an engine comprising a source of fuel at a substantially constant pressure; a conduit connecting said source with said engine; an impeller, a metering orifice, a discharge valve, and a fuel distributor, in series in said conduit, said impeller and distributor adapted to be driven by said engine in accordance with the speed thereof; and a plurality of fuel discharge nozzles adapted to receive fuel intermittently from said distributor and to discharge said fuel in said engine.

19. A fuel metering device for an engine comprising a source of fuel at a substantially constant pressure; a conduit connecting said source with said engine; an impeller, a metering orifice, a discharge valve, and a fuel distributor, in series in said conduit in that order, said impeller and distributor adapted to be driven by said engine in accordance with the speed thereof; a plurality of fuel discharge nozzles adapted to receive fuel intermittently from said distributor at a pressure varying with engine speed and to discharge said fuel in the induction system of said engine; a by-pass around said impeller having two restrictions therein to provide a control pressure intermediate the pressure on either side of said impeller for regulating said discharge valve; and a valve for varying the effective area of one of said restrictions, thereby to vary said control pressure.

EMIL O. WIRTH.
FREDERIK BARFOD.

REFERENCES CITED

The following references are of record in the file of this patent:

UNITED STATES PATENTS

| Number | Name | Date |
| --- | --- | --- |
| 1,597,787 | Hausser et al. | Aug. 31, 1926 |
| 1,802,848 | Summers | Apr. 28, 1931 |
| 1,971,187 | Jacobson et al. | Aug. 21, 1934 |
| 2,126,709 | Alden | Aug. 16, 1938 |
| 2,348,008 | Hunt | May 2, 1944 |
| 2,374,844 | Stokes | May 1, 1945 |

FOREIGN PATENTS

| Number | Country | Date |
| --- | --- | --- |
| 429,682 | Great Britain | June 4, 1935 |
| 523,895 | Great Britain | July 25, 1940 |